Dec. 16, 1941.   T. H. O'BRIEN   2,266,241
MEANS FOR CONTROLLING THE TIMING AND SEQUENCE OF OPERATIONS
Filed July 11, 1938   11 Sheets-Sheet 6
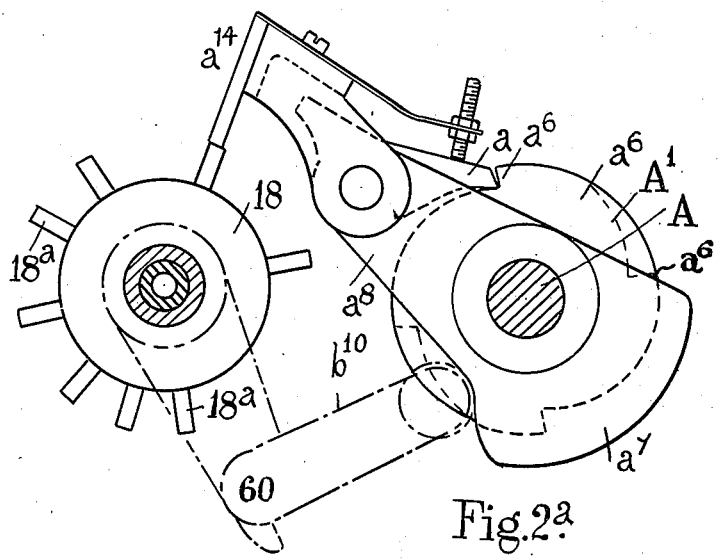
Fig.2.ᵃ
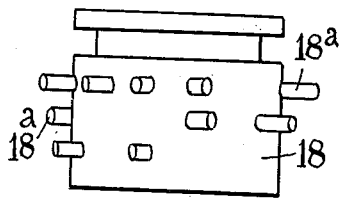
Fig.2.ᵇ
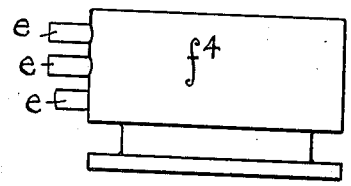
Fig.2.ᶜ
INVENTOR.
T. H. O'Brien.

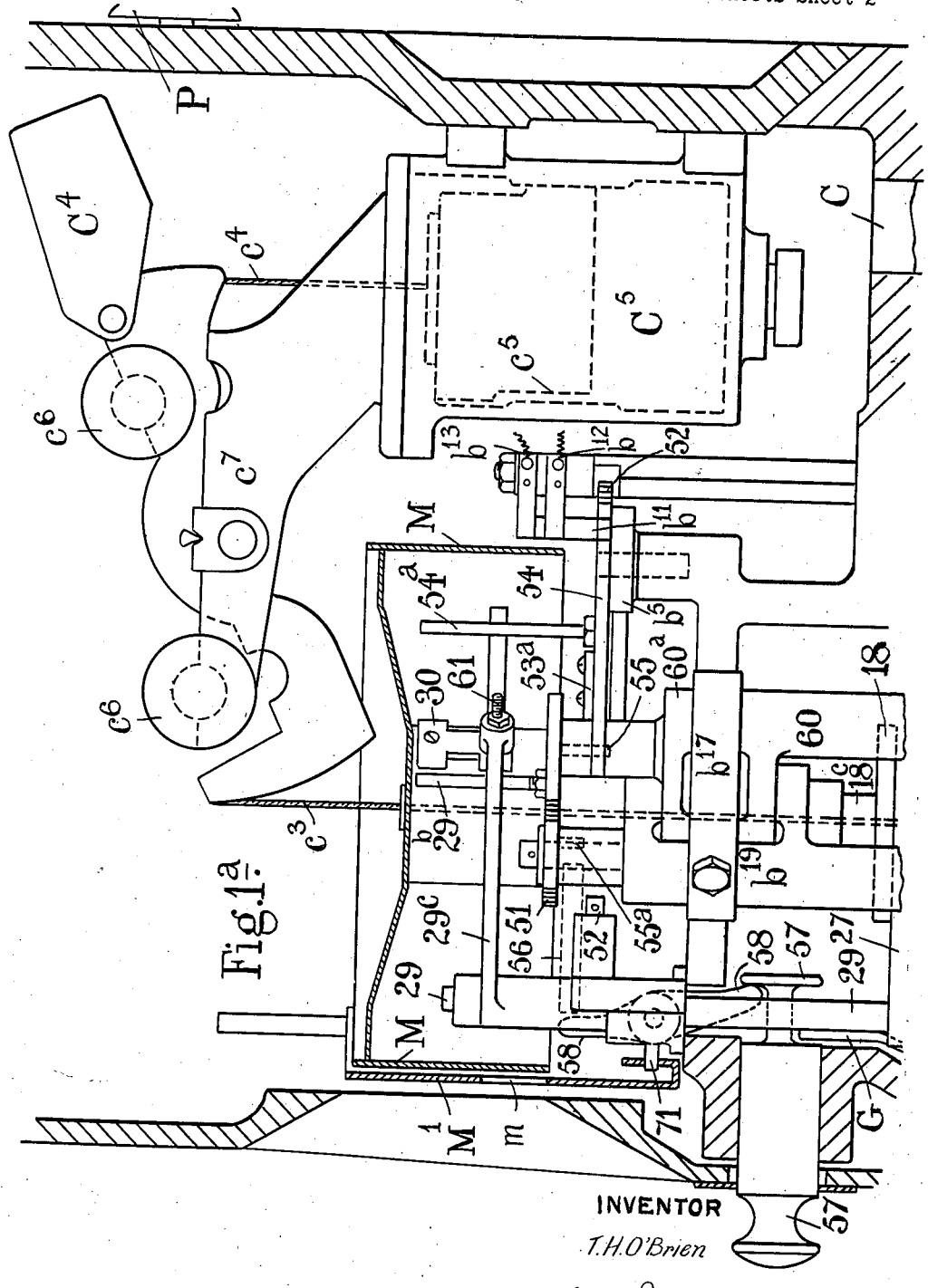

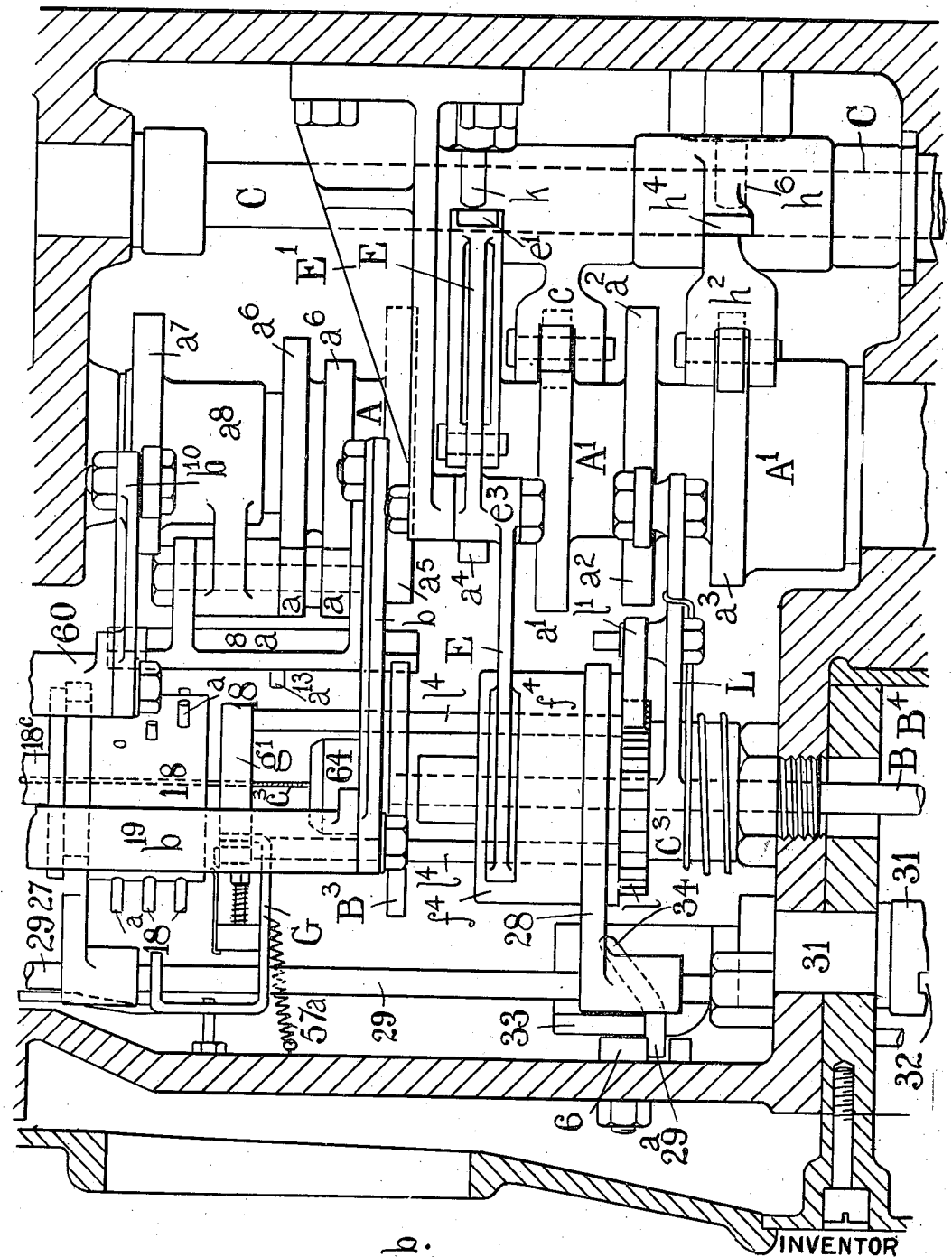

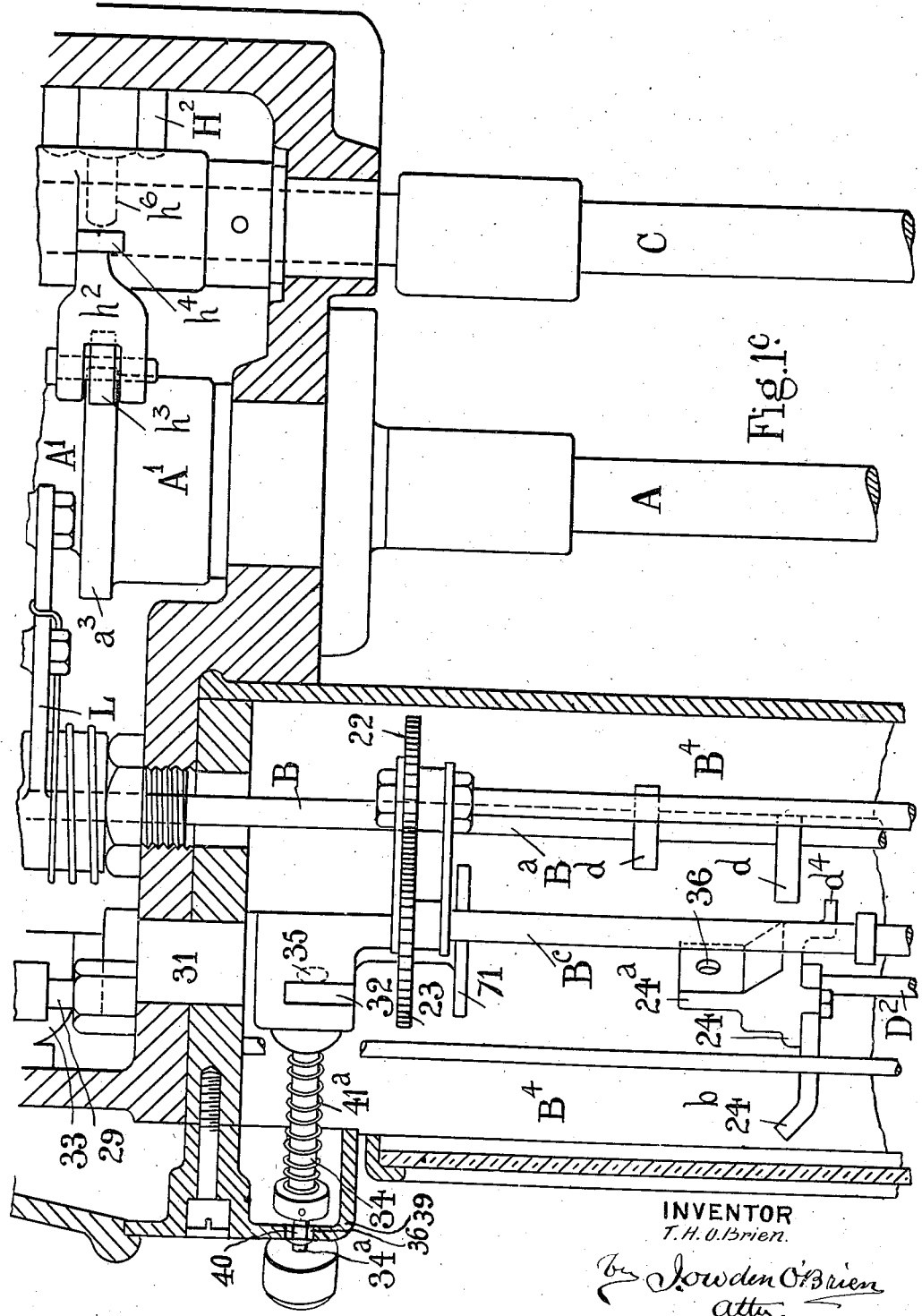

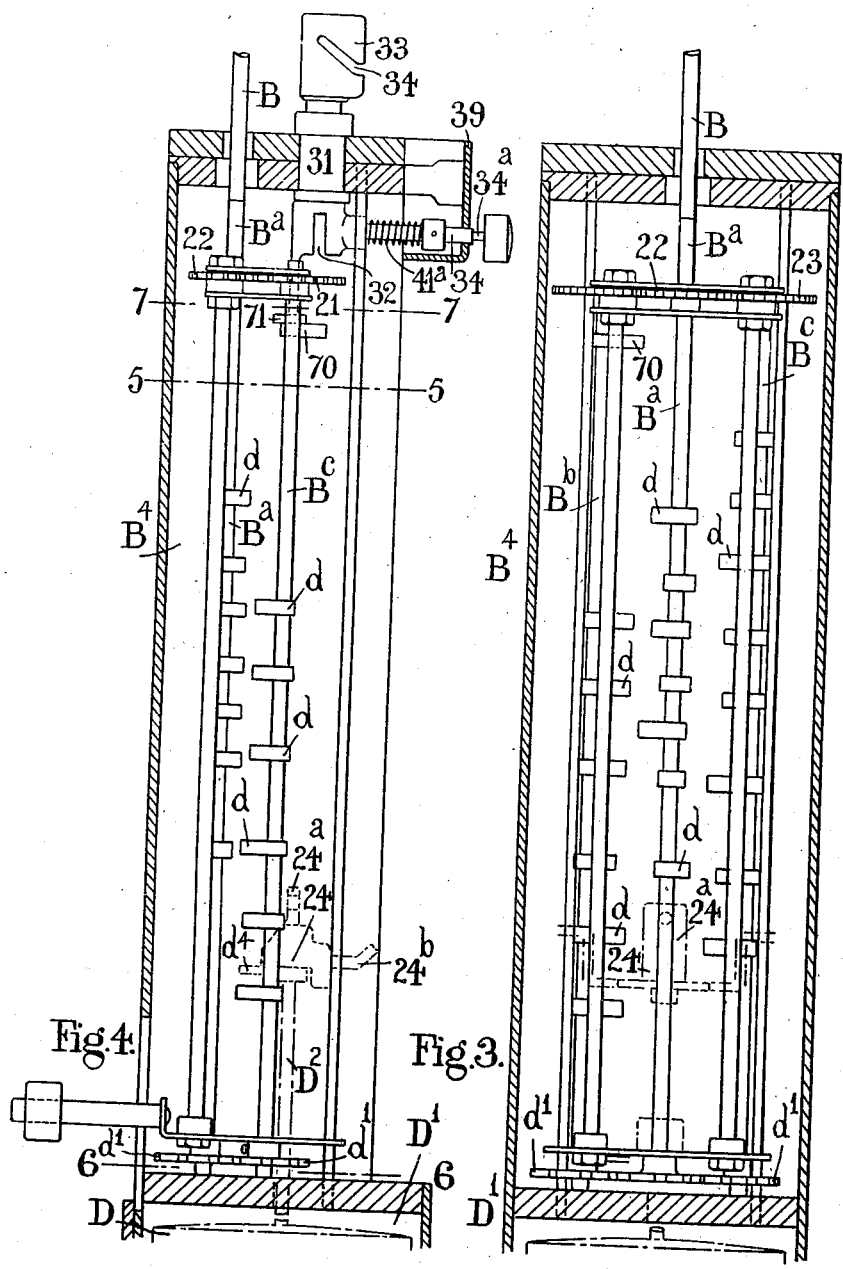

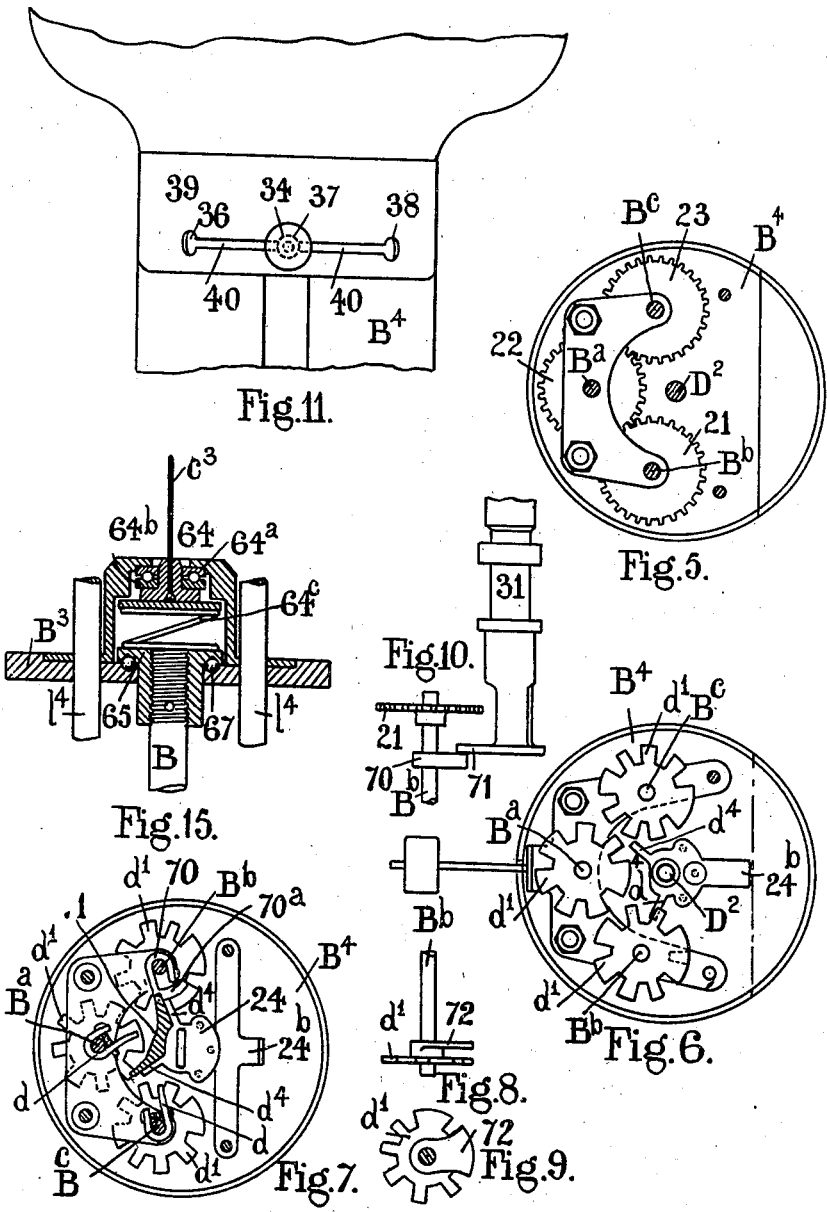

Dec. 16, 1941.                T. H. O'BRIEN                2,266,241
          MEANS FOR CONTROLLING THE TIMING AND SEQUENCE OF OPERATIONS
                     Filed July 11, 1938           11 Sheets-Sheet 9

INVENTOR.
T.H.O'Brien.

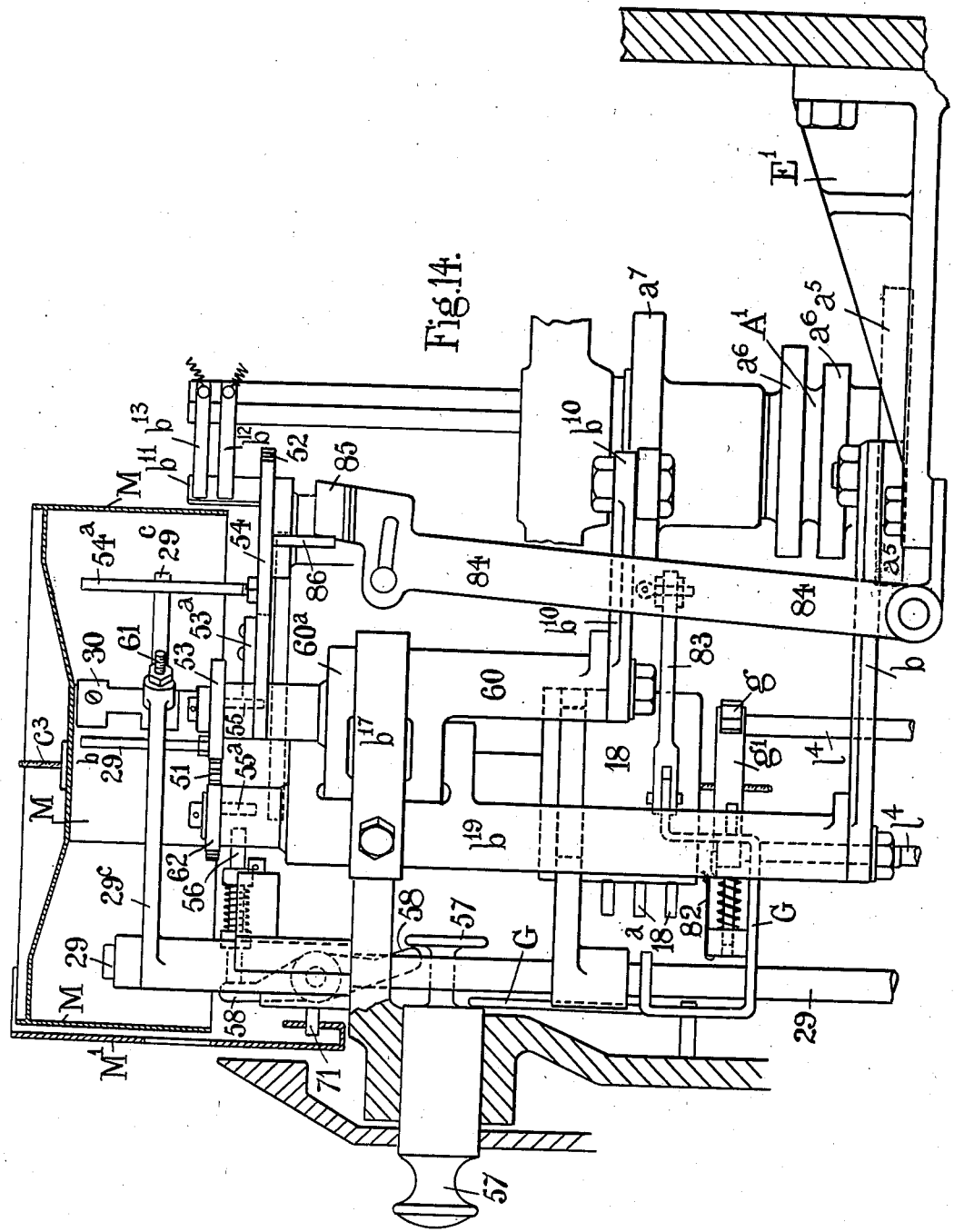

Dec. 16, 1941.　　　T. H. O'BRIEN　　　2,266,241
MEANS FOR CONTROLLING THE TIMING AND SEQUENCE OF OPERATIONS
Filed July 11, 1938　　　11 Sheets-Sheet 11

INVENTOR
T. H. O'Brien

Patented Dec. 16, 1941

UNITED STATES PATENT OFFICE 2,266,241

MEANS FOR CONTROLLING THE TIMING AND SEQUENCE OF OPERATIONS

Terence Herriot O'Brien, Kendal, England, assignor to Isaac Braithwaite & Son Engineers Limited, Kendal, England Application July 11, 1938, Serial No. 218,619
In Great Britain July 20, 1937

7 Claims. (Cl. 74—126)

This invention relates to means for controlling the timing and sequence of operations in machines such as laundry washing machines, dyeing machines, bleaching machines in which articles after having been placed therein are subjected to a series of operations or processes and consists of improvements in or modifications of the controlling means described in specification of Patent No. 2,180,035.

The aforesaid specification described a method and mechanism for pre-selecting any one of three separate series of operations but such mechanism restricted the user to three modifications or variations of one formula, since it only employed a single tripping piece shaft, and did not allow the use of a number of entirely different formulae in the same apparatus and one of the objects of the present modified form of the apparatus is to allow the user to pre-select any one of a number of different formulae which may be entirely different as regards dips, temperature of water, number of processes and duration of processes.

The aforesaid object is achieved according to the invention by employing as many tripping piece shafts as there are different formulae required by the user of the machine, the tripping pieces on each shaft being capable of adjustment to give any desired formula, each tripping shaft being operated by a striker on a single float rod which is adapted to be moved to operate the tripping plate on the tripping piece shaft corresponding to the formula to which the tripping pieces therein are adjusted and all the tripping piece shafts being connected to a common shaft carrying the float obstruction disc.

The invention will be described with reference to the accompanying drawings which show the construction for three separate and distinct selected formulae and consequently requiring three tripping piece shafts but it is to be understood that the invention is not limited to three selected formulae but that any other convenient number may be employed with the equivalent number of tripping piece shafts.

Figure 2:
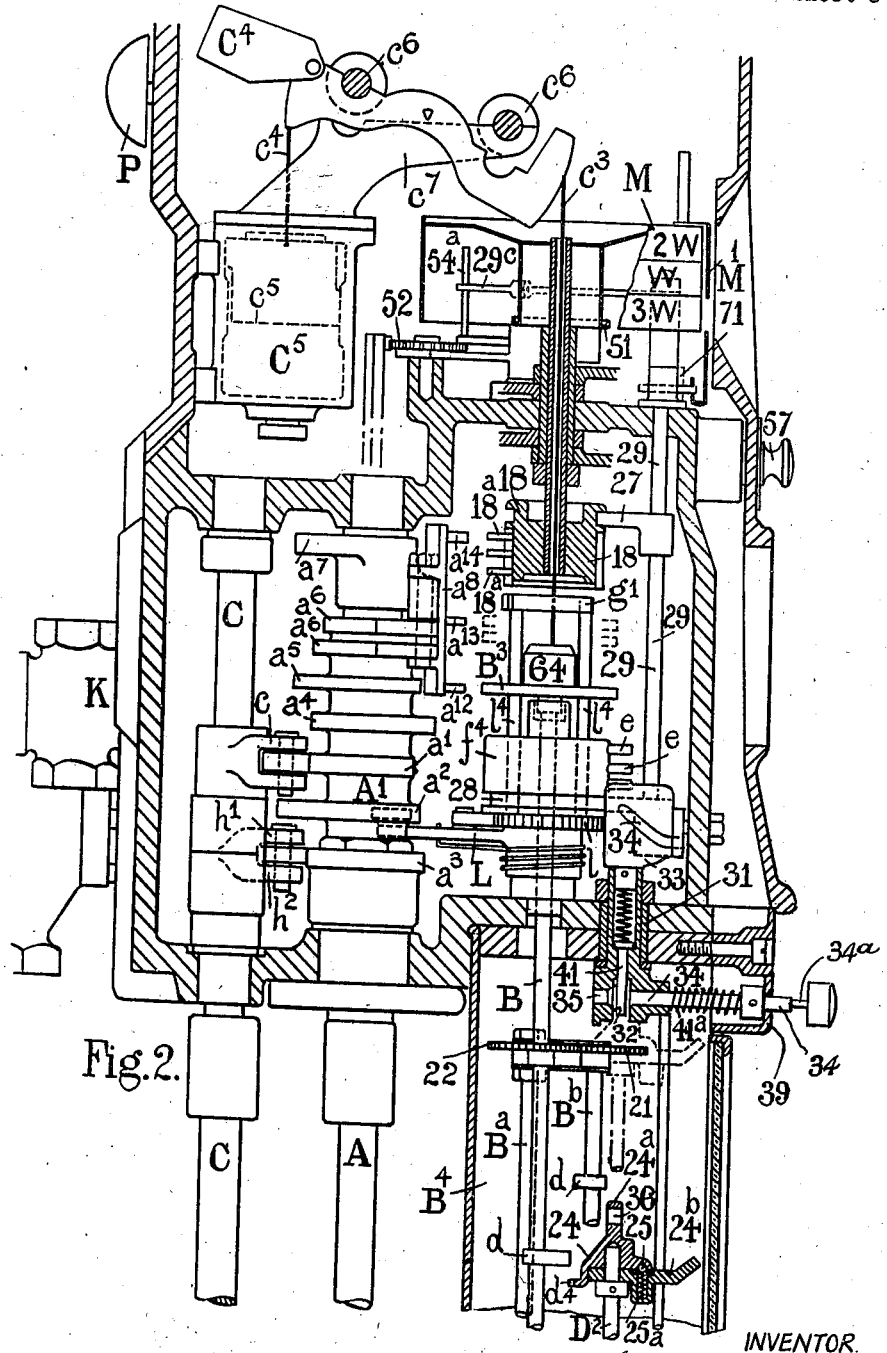
Fig. 2 is a side elevation partly in section looking in the reverse direction.

Fig. 2ª is a plan of the pawl carrier and time obstruction drum.

Fig. 2ᵇ is a front elevation of the time obstruction drum.

Fig. 2ᶜ is a front elevation of the steam drum.

Fig. 3 is a rear elevation partly in section of the chamber B⁴ below the cam and timing mechanism showing the three tripping piece shafts Bª, Bᵇ and Bᶜ therein.

Fig. 4 is a side elevation partly in section of the chamber B⁴ showing the three tripping piece shafts Bª, Bᵇ and Bᶜ looking in the same direction as Fig. 2 and is a continuation thereof.

Fig. 5 is a section looking from below on line 5—5 Fig. 4.

Fig. 6 is a section looking from below on line 6—6 Fig. 4.

Fig. 7 is a section looking from above on line 7—7 Fig. 4.

Fig. 8 is a side elevation of a tripping piece where a less number of sequences are required.

Fig. 9 is a plan of Fig. 8.

Fig. 10 is a side elevation of special tripping piece 70.

Fig. 11 is a detail front view of a portion of chamber B⁴ showing the slot for the selector knob for the different formulae.

Figure 12:
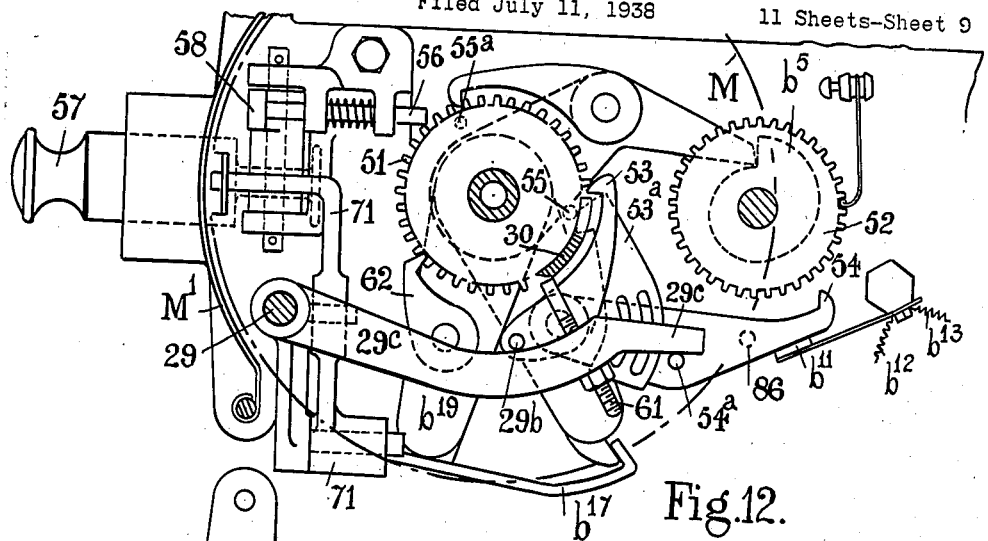

Fig. 12 is a plan of the time control mechanism.

Figure 13:
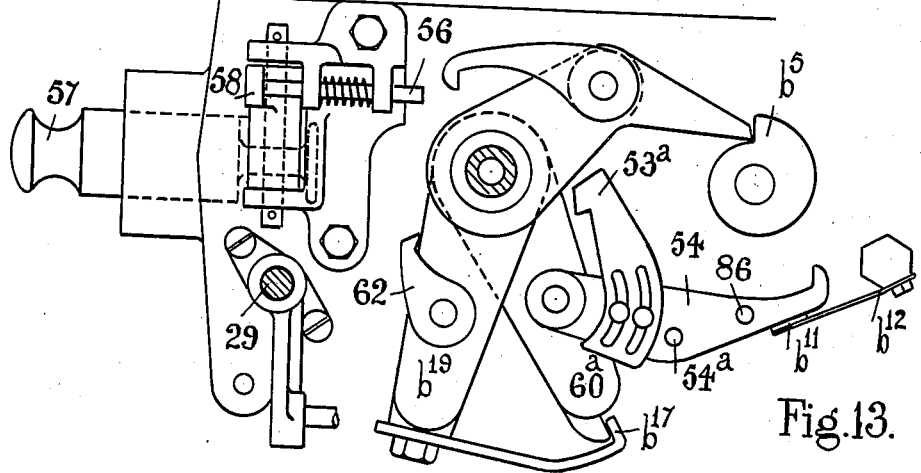

Fig. 13 is a similar plan with parts of the mechanism removed.

Fig. 14 is a side elevation of Fig. 12.

Fig. 15 is a vertical section of a slipping clutch interposed between the tripping piece shaft and its driving member.

Figure 16:
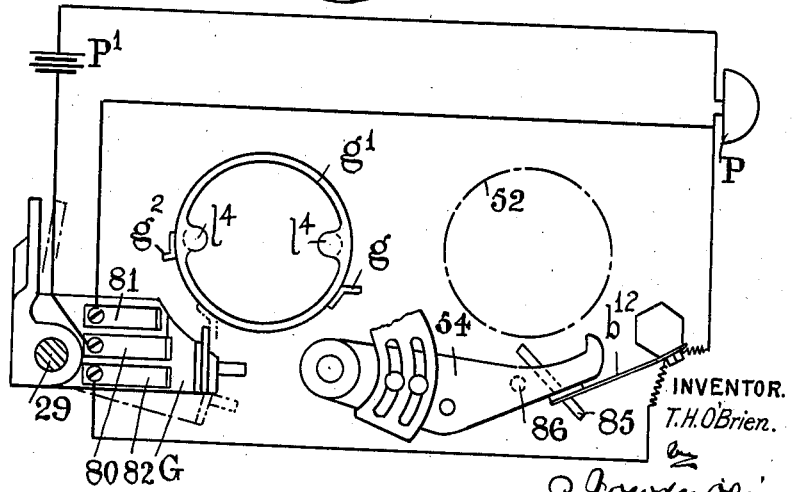

Fig. 16 is a plan of electrical contacts for giving an audible and/or visual signal at a certain stage in the operations for the introduction of soap or other detergent.

Figures 17, 18:
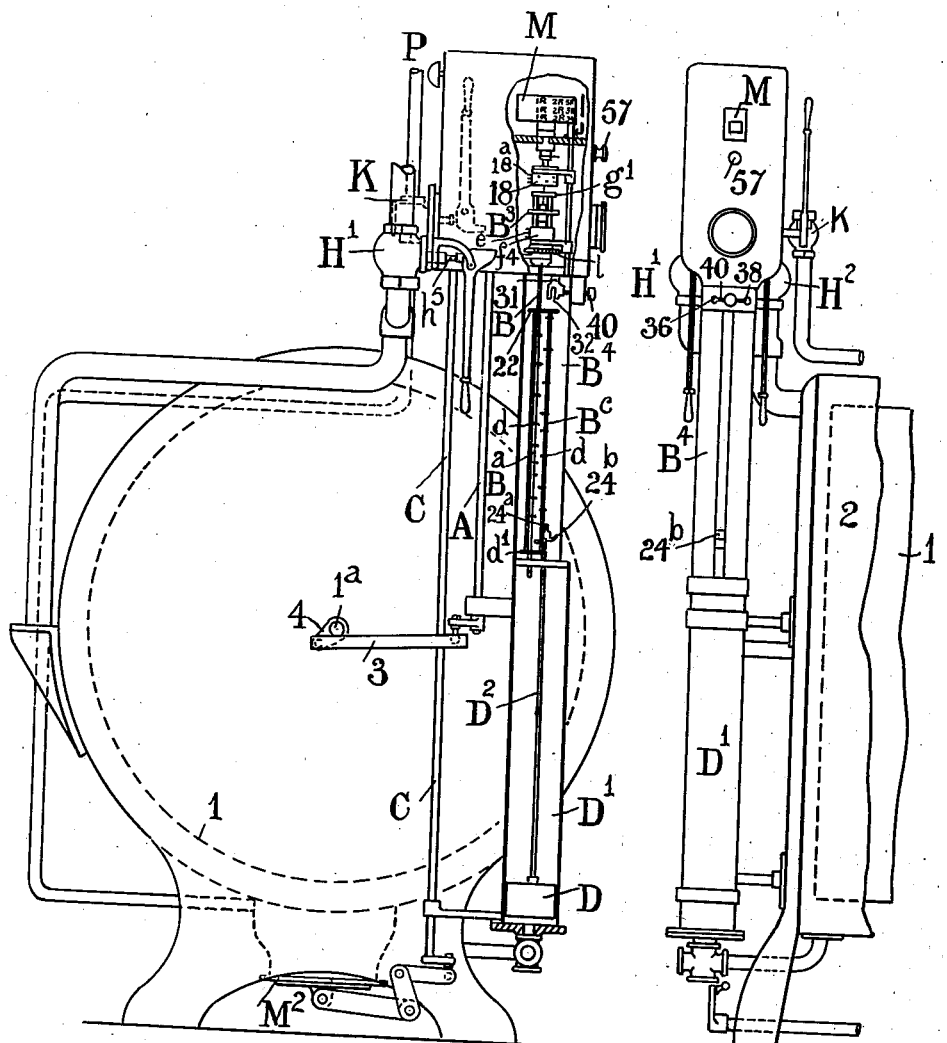

Fig. 17 is a side elevation of a washing machine showing part of the controlling mechanism in section.

Fig. 18 is a front elevation of one end of a washing machine having the invention applied thereto.

The washing machine, see Figs. 17 and 18, is of known type containing a horizontal drum 1 which is continuously rotated first in one direction and then in the opposite direction within a casing 2. The shaft 1ª of the drum 1 is connected by a crank 4 and connecting rod 3 to a vertical shaft A, as shown in Figs. 1, 2, 17 and 18, in such a way that this shaft receives an oscillating movement as the drum 1 rotates and forms the drive for operating the various valves and mechanisms for carrying out the sequences of operations of the processes in the machine. The shaft A thus forms the device for timing the sequence of operation of the machine. The upper part of the shaft A oscillates within a cam shaft A¹ carrying the various operating cams and the shaft A carries the arm or pawl carrier $a^8$ operated by the time obstruction drum 18 to connect the cam shaft A¹ to the shaft A, see Fig. 2ª.

Before describing the details of construction of the different parts of the apparatus the following short description of the timing sequence of operations of the machine will assist in the understanding of the purpose of the different parts.

Figure 1:
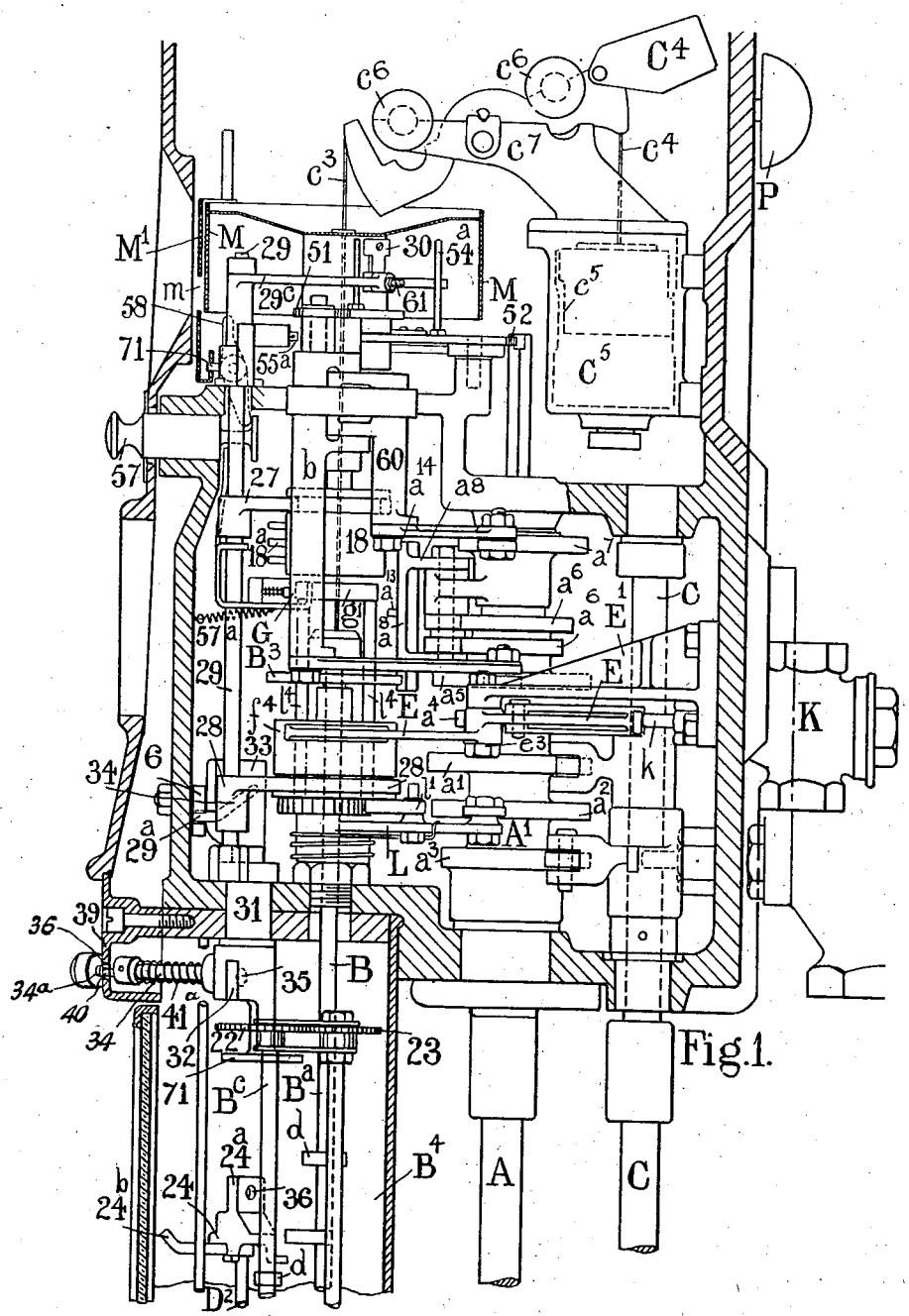
Fig. 1 is a side elevation partly in section of the cam mechanism and timing mechanism and Figs. 1ª, 1ᵇ, 1ᶜ are enlarged part side elevations of Fig. 1.

The shaft A oscillates within the cam sleeve $A^1$ which carries at its upper end a compound ratchet wheel $a^6$ each part of which is engaged by one of the pawls $a$ (see Figs. 1b and 2a). Each part of the compound ratchet wheel $a^6$ has two teeth angularly spaced at 180° the teeth of one part being at 90° to those of the other part. A drum 18, see Figs. $2^a$ and $2^b$ which will be referred to as the "time obstruction" carrying, projecting pegs $18^a$ arranged in three or other number of circumferential rows, is initially set manually to initiate operation by causing the pawl $a$ to engage the ratchet $a^6$ after which the pawl is moved to an inoperative position. A float D then comes into play to cause obstruction means referred to as the float obstruction $B^3$ to come intermittently into play to move the pawl $a$ into position to operate the cam sleeve $A^1$ intermittently. After a number of such intermittent movements of the cam sleeve $A^1$ a time obstruction cam $a^5$ comes into action and causes intermittent step by step movement of a tripping shaft B, see Figs. 1, 2, 3 and 4, until another projection $18^a$ in the same circumferential row comes into action to effect engagement of the pawl $a$ and rotation of the cam sleeve $A^1$. The tripping shaft B is connected to three shafts $B^a$, $B^b$ and $B^c$ which are geared together and operated by the striker $d^4$ on the float rod $D^2$ as shown in Figs. 3, 4, 5, 6 and 7. Similar cycles follow until all the required number of projecting pegs $18^a$ in one circumferential row have effected operation of the cam sleeve $A^1$ after which the entire operation ceases until the time obstruction 18 is reset. In order to provide a variation from the formula carried out by the sequence already referred to, the time obstruction 18 is formed as a drum with three, or other number of circumferential rows of projections $18^a$ the projections in one circumferential row enabling the machine to carry out that particular formula whilst the projections in the other circumferential rows are inoperative. If it is desired to operate the machine on a different formula, the drum 18 is moved vertically manually to bring another of the circumferential row of projections $18^a$ into position to actuate the pawl $a$. It is thus possible to operate the washing machine on any one of three, or other number, of different preselected formulae by arranging the required row of circumferential projections $18^a$ to actuate the pawl $a$.

A detailed description of the apparatus will now follow:

The pawl $a$ is formed in two parts mounted on a pawl carrier $a^8$ one or other part of which is adapted to engage the ratchet wheel $a^6$ which is formed in two parts mounted one below the other on the cam sleeve $A^1$. The ratchet wheel $a^6$ and with it the cam sleeve $A^1$ are rotated through 90° each time the pawl $a$ is operated by the projecting pegs $18^a$. The number and contour of the cams carried on the cam sleeve $A^1$ depends on the various valves and mechanism which are to be controlled thereby and the particular construction shown in the drawings comprises a cam $a^3$ controlling the opening and closing of cold and hot water supply valves $H^1$ and $H^2$ for admitting water to the casing of the machine, a cam $a^4$ for opening and closing a steam valve K for supplying steam to the machine, when the temperature required at any stage is higher than that of the water, a cam $a^1$ to open and close the drain valve of the machine, a cam $a^5$ for rendering operative or inoperative the mechanism for actuating the "time obstruction" disc 18 and a cam $a^2$ controlling the operation of the tripping piece shaft B the function and operation of which will be more fully described.

The cam $a^1$ controlling the drain valve $M^2$ is a simple single peak cam which operates the arm $c$ on a vertical shaft C once for every revolution of the cam sleeve $A^1$, the shaft C being connected to the drain valve $M^2$ so that the latter is opened by the movement of the shaft and held open a sufficient length of time to drain off the contents of the casing of the machine.

The shaft B is controlled by the cam $a^2$ arranged on the cam sleeve $A^1$ above the cam $a^3$, the cam $a^2$ being formed with three peaks which will operate an arm L carrying a pawl $l^1$ three times for each revolution of the cam sleeve $A^1$. The pawl $l^1$ drives a ratchet $l$ on a sleeve $C^3$ from which a pair of guide rods $l^4$ project parallel with its axis of rotation. The rods $l^4$ carry a ring $g^1$ which will be described later and serve as guides for the vertical movement of the float obstruction disc $B^3$ which is attached by the cable $c^3$ to one arm of a balanced beam $C^4$, the other arm of which is attached by a cable $c^4$ to the piston $c^5$ of a dashpot device $C^5$ having its ports so arranged that its retarding action is practically nil at the last part of its stroke.

The beam $C^4$ which carries the tripping piece shaft B and the dash pot piston $C^5$ has a rider $c^6$ at each side of its fulcrum, each rider resting on the beam, the weight of the rider being taken off the beam by a fixed carrier $c^7$ when the arm of the beam descends below the horizontal.

The effect of these riders is as follows:

When the tripping piece shaft B is not influenced by the striker $d^4$ of the float rod $D^2$ the beam $C^4$ is balanced and assumes a horizontal position. If through any cause the beam tends to leave this position it will pick up one or the other of the riders $c^6$ and will therefore become unbalanced. The riders thus ensure that the beam is normally horizontal and the float obstruction disc $B^3$ cannot accidentally actuate either of the projections $a^{12}$ or $a^{13}$ on the pawl carrier $a^8$.

When the machine is empty of liquid and the weight of the float acts on the tripping plate $d^1$ the beam $C^4$ becomes unbalanced and the tripping piece shaft B falls, the weight of the float D overcoming the weight of the rider $c^6$ on the right hand side of Fig. 1 which is now picked up by the back arm of the beam whilst the rider $c^6$ on the left hand side rests on the carrier $c^7$.

Similarly, when liquid enters the machine and the striker $d^4$ comes in contact with any one of the tripping pieces $d$ the buoyancy of the float D overcomes the weight of the rider $c^6$ which is picked up by the front arm of the beam.

A single cam $a^3$ controls the cold water supply valve $H^1$ and the hot water supply valve $H^2$. The cam $a^3$ is a simple single peak cam which controls two pivoted arms $h^1$ and $h^2$ each carrying a roller $h^3$ in contact with the face of the cam and each having a projection $h^4$ to engage a spring controlled stem $h^5$ or $h^6$ of the valves $H^1$ or $H^2$ and open the valve.

The steam control cam $a^4$ is also a single peak cam which operates the spring controlled stem $k$ of a steam valve K through the bell crank lever $e^1$ which is pivotally mounted on an arm E pivotally mounted at $e^3$ on a fixed pivot carried by the bracket $E^1$.

The arm E is normally in such a position that the oscillation of the lever $e^1$ will not operate the valve, and it is only when the arm E is moved into position by a projection $e$ on the sleeve $f^4$ that the valve K will be operated.

In the arrangement shown in the drawings where three independent formulae may be used, there are provided three pegs capable of occupying any position in three circumferential rows on the steam drum $f^4$ the appropriate peg $e$ being simultaneously selected manually when the desired formula is selected.

The drum 18 is slidably mounted on a hollow shaft $18^c$ carrying an indicator drum M so that it can be moved vertically to bring any one of the three rows of pegs $18^a$ opposite the striker arm $a^{14}$ which controls the locking of the cam shaft $A^1$ to the oscillating shaft A on which it is mounted.

The sleeve $f^4$ carrying the pegs $e$ which cause the lever E operating the steam valve K to be moved into the path of the steam control cam $a^4$ is provided with three pegs $e$ arranged at different levels and is also arranged to be moved vertically on guides $l^4$ so that any of the pegs $e$ can be moved into line with the lever E operating the steam valve K.

The float obstruction $B^3$ is controlled by one or the other of three separate shafts $B^a$, $B^b$ and $B^c$ as shown in Figs. 3 to 7, each of which is provided with tripping pieces $d$. The shaft $B^a$ is a continuation of the shaft B and the shafts $B^b$ and $B^c$ are parallel therewith. The three shafts are geared together near the top of the chamber $B^4$ by the gear wheels 21, 22 and 23 so that the shafts can be rotated together. Each shaft carries a series of tripping pieces $d$, those on each shaft being differently arranged than those on the other shafts, whereby each shaft will correspond to a different formula. The float rod $D^2$ which rises and falls with the float D in the float chamber $D^1$ carries two strikers $d^4$ mounted on a plate 24 which may be swivelled about the rod so that one or the other of the strikers will engage the tripping pieces $d$ on one or the other of the shafts $B^a$, $B^b$, or $B^c$.

The plate 24 swivels on the plate $24^b$ which slides on two vertical guide rods and forms the location for the upper end of the float rod $D^2$. The plate 24 is located in the correct position relative to each shaft by depressions which engage a ball 25 and spring $25^a$ in the plate $24^b$.

The time obstruction drum 18 having three rows of pegs, is slidably mounted on the shaft so that it can be moved vertically to bring any one of the three rows of pegs $18^a$ opposite the striker arm $a^{14}$ which controls the locking of the cam shaft $A^1$ to the oscillating shaft A on which it is mounted.

The time obstruction drum 18 and the sleeve $f^4$ carrying the pegs $e$ are moved vertically by the forks 27 and 28 affixed to a vertical selector shaft 29 capable of being raised or lowered by a lever 6. The shaft 29 carries a pin $29^a$ which fits into the slotted end of the pivoted lever 6. The lever 6 is moved by an oblique groove 34 in a quadrant plate 33 so that on rotation of the quadrant plate which engages a pin on the lever 6, the lever 6, the shaft 29, the time obstruction drum 18 and the sleeve $f^4$ are moved up or down to bring one or the other of the rows of pegs $18^a$ and pegs $e$ on the latter into their respective operative positions necessary for the timing and of opening of the steam valve for the corresponding formula.

The formula indicator drum M is provided with separate formulae and is surrounded by a mask $M^1$ which uncovers one or the other of these formulae and is operated from the shaft 29 by a lever 71 (See Fig. 12) pivoted at one end and connected to the shaft 29 midway between the two ends. The lever 71 thus doubles the vertical movement of the mask $M^1$ relative to the shaft 29 so that the vertical movement of the latter causes the particular formula to be unmasked which corresponds to the vertical position of the pegs $18^a$ and the pegs $e$.

The selector shaft 29 also carries a lever $29^c$ which co-operates with a time formula plate 30 on the hub of the formula drum M on which is mounted the wheel 51 rotating the time obstruction drum 18 the function of which plate will be described later. Thus when the selector shaft 29 is moved axially the timing of the processes, the point of opening of the steam valve K and the position of the time formula plate 30 relative to the lever $29^c$ are simultaneously selected.

Interconnection between the selector shaft 29 and the float rod $D^2$ is effected as follows:

A swivelling plate 24 with two strikers $d^4$ is affixed on the top of the rod $D^2$ and is provided with a vertical tongue $24^a$ with a horizontal hole 36 passing through it, see Figs. 1 and 2. A bush 31 is carried by the frame of the apparatus coaxially with the float rod $D^2$ at the lower end of which bush a vertical slot 32 is formed into which the tongue $24^a$ on the swivelling striker plate 24 will fit. The quadrant plate 33 is attached to the upper end of the bush 31, which plate is formed with the inclined slot 34 which by engagement with the pin $29^a$ in the lever 6 raises and lowers the selector shaft 29.

Thus when the swivelling-striker plate 24 is raised manually until the tongue $24^a$ thereon engages in the slot 32 in the bush 31 and the latter then turned through a predetermined angle the strikers on the plate 24 will be set in a predetermined position and the selector shaft 29 will be raised or lowered a predetermined amount. A single movement of the selector bar 34 makes all the changes necessary to select one of the three formulae.

It is necessary to ensure that the tongue $24^a$ on the striker plate 24 is always engaged in the slot 32 in the bush 31 before the latter is rotated and this is done as follows:

The bush 31 is turned by a bar 34, Fig. 1, which is a sliding fit in a hole 35 in the bush which can be made to coincide with a hole 36 in the tongue $24^a$ so that if the tongue $24^a$ is raised into the slot 32 in the bush the bar 34 will pass through both. If the tongue $24^a$ is not in position the bar is prevented from entering the slot by a spring controlled plunger 41 which passes across the path of the bar 34.

The three angular positions of the bar are located by three holes 36, 37 and 38 formed in a plate 39 (see Fig. 11) attached to the frame through which the bar 34 projects, these holes being connected by a slot 40 of narrower width than the diameter of the bar but of sufficient width to receive a neck $34^a$ formed near the outer end of the bar. When the bar 34 is held out of the slot 32 in the bush 31 by the spring plunger 41 it passes through one of the three holes 36, 37 and 38 and is prevented from lateral movement but when the tongue $24^a$ is raised into the bush 31, the bar 34 may be pushed through the tongue and the portion of reduced diameter $34^a$ on the bar comes opposite the slot 40 on the plate 39 and the bar may then be moved laterally to rotate the bush 31 through the required angle. When this has been done the bar will be concentric with another of the holes in the plate 39 and will be locked therein by the pressure of a controlling spring 41. At the same time the tongue $24^a$ will be released and the plunger 41 will prevent further movement of the bar until the swivelling striker plate 24 is again raised manually to bring its tongue $24^a$ into the slot 32 in the bush 31.

Above the cam $a^4$ is the "time obstruction" cut out cam $a^5$ which renders operative or inoperative the mechanism for operating the "time obstruction" drum 18 which in turn as previously described controls the engagement of the pawls $a$ carried by the shaft A with the teeth of the ratchets on the cam sleeve $A^1$.

The cam $a^5$ controls the time obstruction operating arm comprising a vertical pillar $b^{19}$, horizontal arm $b$ and horizontal lever $b^{17}$. When the time obstruction operating arm $b$ moves inwards under the action of a spring it brings the end of a pivoted time obstruction arm comprising an arm $b^{10}$, vertical pillar 60 and horizontal arm $60^a$ into engagement with the face of a cam $a^7$ carried by the oscillating shaft A so that the time obstruction arm is oscillated by the cam $a^7$, see Figs. $2^a$, 12, 13, 14.

Resetting of the timing gear is carried out through a pawl operated wheel 51, see Figs. 12, 13 and 14, which rotates the time obstruction drum 18, and also the wheel 52, driven by the time obstruction arm and formed with spur teeth the pawls 53 and 54 operating them being suitably shaped, the wheel 51 carrying a peg or pin 55 which on the completion of the timing operation of the last stage of one formula comes into position to engage the tail piece $53^a$ of the pawl 54 engaging the teeth on the wheel 52 driven by the time obstruction arm thereby preventing rotation of the wheel and so preventing any further movement of the time obstruction drum 18. At the same time an audible and/or visual warning device such as a bell P is brought into operation by the bridge piece $b^{11}$ tailing contacts $b^{12}$ and $b^{13}$ intermittently and such warning continues until the machine is stopped or the knob 57 is pressed.

The manual rotation of the toothed wheel 51 carrying the peg or pin 55 which causes the stopping of the rotation of the time obstruction drum for restarting the sequence of operations is brought about by a spring controlled plunger 56 which is operated by a sliding knob 57 through a pivoted two armed lever 58 to engage a second pin $55^a$ on the toothed wheel 51, each time the plunger 56 is operated the wheel 51 being rotated a distance of one tooth. The knob 57 is pulled out to rotate the wheel 51 a distance of one tooth and can only carry out the operation when the pin is in the correct position i. e. at the end of a process.

The effect of this depends on whether in the selected process it is required to retain the water of the previous last process for use in the first process of the new sequence or whether fresh water is to be introduced into the machine.

When the water of the last process is to be re-used in the next process the action of pulling out the knob 57 moves the time formula plate 30 round under the pin 61 lifting the lever $29^c$ which by coming out of contact with the pin $29^a$ allows the pawl 53 to drop into engagement with the toothed wheel 51 and at the same time the pawl 54 is held out of engagement with the wheel 52 by the pin $54^a$ on the pawl 54 being engaged by the lever $29^c$.

The pawl 53 is driven from the oscillating cam $a^7$ through the lever 60 and will continue to rotate the wheel 51 until the pin 61 on the lever $29^c$, see Figs. 12, 13 and 14, reaches the end of the time formula plate 30 when the pawl 53 is drawn out of engagement with the wheel 51 and at the same time the pawl 54 is engaged with wheel 52 and the timing of the process commences.

The angular position of the drum M when timing starts depends on the length of the time formula plate 30. Thus by lengthening or shortening this plate the duration of the wash is shortened or lengthened.

When it is required to empty the machine and refill with fresh water for the first process of the formula, the knob 57 is pulled rotating the toothed wheel 51 a distance equal to one tooth as before. In this case the time formula plate 30 does not engage the lever $29^c$ on such movement, but a peg $18^a$ on the time obstruction drum 18 is brought opposite the projection $a^{14}$ on the arm $a^3$ thereby engaging the pawl $a^6$. The cam shaft A is thus turned and the time suspension cam $a^5$ swings back the time suspension arm which carries the pawl 62. The pawl 62 turns the toothed wheel 51 to bring the time formula plate 30 under the pin 61. Movement of the lever 60 is suspended until the required amount of water has been run into the machine and both water valves are closed, when the time suspension cam $a^5$ allows the arm $b$ to move inwards thus bringing arm 60 down on cam $a^7$ and bringing pawl 53 into engagement with wheel 51 which is then ratcheted around as above described to bring the start of the timing process to the required point. The pin 61 engaging the time formula plate 30 is carried by the lever $29^c$ mounted on the upper end of the shaft 29 and moves with it when the required formula is being manually selected.

Fig. 16 shows the circuit of the audible and/or visual signal such as the bell P which comes into operation either to give a continuous signal as an indication for the introduction of soap or the like or an intermittent signal to indicate the end of the process. In this arrangement there are two circuits from the battery $P^1$ to the bell P, the battery being connected to a common terminal 80 of both circuits. When the projection $g$ on the ring $g^1$ engages the contact maker G it moves the latter to bridge the contacts 80 and 81 thus completing the first circuit to the bell to give an indication for the introduction of soap. A shorter projection $g^2$ on the ring $g^1$ engages the contact maker G at the end of the process and moves the contact maker G a shorter distance, the contacts 80 and 82 being longer than the contacts 81, to complete the second circuit at the end of the process. In this circuit however is the intermittent make and break $b^{12}$, $b^{13}$ and $b^{11}$ operated by the lever 54 (see Figs. 12, 13, and 16) so that on the contacts 80 and 82 being bridged an intermittent signal will be given to denote the end of the process.

When the bell P or other signal warns the operator that the introduction of detergents are required it is necessary to suspend timing of the process until the signal has been stopped by the operator. For this purpose the contacts 81, 80 and 82 are mounted on a swivelling bracket which is moved by the depression of the knob 57 to bring the contacts away from the path of the projections on the ring $g^1$, the bracket being returned by the spring 57ª. The depression of the knob 57 also operates the rod 83 to move the pivoted vertical rod 84 having at its upper end an inclined face 85 which engages the pin 86 on lever 54 and moves the latter out of engagement with the wheel 52. The lever 84 is linked to the contact maker G so that when the latter moves forward to bridge the contacts 80 and 81 to close the signal circuit, it pulls forward the lever 84 and the inclined plate 85 engages with the pin 86 on the pawl 54 holding it away from the wheel 52 thus suspending the timing. When the knob 57 is released to allow the bracket carrying the contacts 81, 80 and 82 to swing back under the influence of the spring 57ª the inclined plate 85 is thrown clear of the pin 86 allowing the pawl 54 to come into engagement with the wheel 52 and the timing of the process to be restarted.

A slipping clutch 64 may be introduced into the drive of the tripping piece shaft B (see Fig. 15). The clutch comprises a plate 65 on the shaft B driven through the balls 67 on the float obstruction plate $B^3$. The balls are located in depressions in the plates and are not equally spaced so that if the clutch has slipped and has not returned to its correct setting this will be shown by a canting of the plate. A strong spring 64ᶜ maintains the requisite pressure for the drive.

A ball race 64ª, 64ᵇ is provided between the suspension cable $c^3$ and the clutch to prevent twisting of the cable.

The projection $a^{14}$ on the arm $a^8$ may be hinged so that it will yield under side pressure to prevent it being damaged should the drum be rotated when the projection is between two pegs.

The controller as described has a sequence of eight processes, but the invention is not limited to this number and the controller may be arranged to give a sequence of more or less than eight processes.

Further, in a controller designed for a sequence of a given number of processes, one or more of the formulae may be arranged with a smaller number of processes, this being done at the start of a sequence by running through one or more process cycles in a few seconds in the following manner:

The tripping plate $d^1$ instead of having a slot shown in dots in Fig. 6 to allow striker $d^4$ to fall through when the machine is drained is left solid, so that the float obstruction disc $B^3$ is held down and the striker $a^{12}$ strikes it repeatedly until the tripping plate $d^1$ has rotated to bring a slot opposite the striker $d4$.

Thus the cam shaft $A^1$ is turned quickly through a complete turn, all the operations for a process being gone through in a few seconds. Should the inflow of water to the machine be such that the float lifts during this period, the float obstruction disc $B^3$ might be allowed to return to the neutral position. To prevent this a special tripping piece 70 similar to $d$ but having a wider face is fitted near the top of the rod $B^b$ carrying the particular formula and engages the underside of a projection 71 extending below the bush 31. The length of the face is such that it engages when the rod is drawn down and is disengaged at the same time as $d^4$ falls through the slot. A flange 72 fitted above the solid portion of the tripping plate $d^1$ (see Figs. 8 and 9) prevents the striker $d^4$ rising under the influence of the float and possibly fouling a tripping piece at a higher level.

Instead of the shaft A being driven from the washing machine it may if desired be driven from an independent source through a suitable reduction gear.

What I claim as my invention and desire to protect by Letters Patent is:

1. Means for controlling the timing and sequence of operations in machines of the type referred to having a variable liquid level comprising a continuously oscillating shaft, a common cam shaft surrounding the oscillating shaft, a series of cams and a ratchet wheel mounted for movement together on the cam shaft, a pawl carried by the oscillating shaft for intermittently rotating the ratchet wheel and cam shaft, a time obstruction drum, three circumferential series of projecting members on said drum arranged one above the other, the members in each series being arranged to operate successively and one member in each series being adapted to be set manually to initiate operations by causing the pawl to engage the ratchet, means for subsequently moving the pawl to an inoperative position, a float obstruction controlled by the level of liquid in the machine to intermittently come into play to move the pawl into position to further operate the cam shaft intermittently between operations by the time obstruction drum operable by one of the cams to continue operation of the controlling means to bring the next successive projecting member of the time obstruction drum into operation after an operation of the cams by the float obstruction, a vertical shaft carrying the float obstruction, a plurality of tripping piece shafts geared together and connected to the aforesaid vertical shaft, a series of angularly and vertically spaced tripping pieces on each tripping piece shaft, the tripping pieces on each shaft being arranged to give a different sequence of operation, a float rod rising and falling with the level of the liquid in the machine, a striker carried on the float rod and adapted to be rotated thereon to be in a position to engage the tripping pieces on any one of the tripping piece shafts, the particular tripping piece engaged by the plate depending on the angular position of the shaft and thereby lift the shaft and the float obstruction to engage the pawl and move it into engagement with the ratchet on the cam shaft whereby the latter is rotated when the float has risen to a level determined by the position of the tripping piece.

2. Means for controlling the timing and sequence of operations in machines of the type referred to having the means claimed in claim 1 in combination with a vertical selector shaft by which any one of the plurality of series of operations can be selected, forks attached to said selector shaft and engaging the time obstruction drum, and means for moving said shaft vertically into any one of the positions necessary for bringing the desired series of projecting members on the time obstruction drum into alignment with the pawl actuating the ratchet on the cam shaft.

3. Means for controlling the timing and sequence of operations in machines of the type referred to having the means claimed in claim 1 in combination with a vertical selector shaft by which any one of the plurality of series of operations can be selected, forks attached to said selector shaft and engaging the time obstruction drum, means for moving said shaft vertically into any one of the positions necessary for bringing the desired series of projecting members on the time obstruction drum into alignment with the pawl actuating the ratchet on the cam shaft, a formula drum on which the different series of operations are indicated one above the other and a mask covering said drum raised and lowered by the vertical selector shaft whereby the indications of all the series of operations except the series corresponding with the position of the selector shaft are marked.

4. Means for controlling the timing and sequence of operations in machines of the type referred to having the means claimed in claim 1 in combination with a vertical selector shaft by which any one of the plurality of series of operations can be selected, forks attached to said selector shaft and engaging the time obstruction drum, means for moving said shaft vertically into any one of the positions necessary for bringing the desired series of projecting members on the time obstruction drum into alignment with the pawl actuating the ratchet on the cam shaft, a formula drum on which the different series of operations are indicated one above the other, a mask covering said drum raised and lowered by the vertical selector shaft whereby the indications of all the series of operations except the series corresponding with the position of the selector shaft are marked, means for raising and lowering the vertical selector shaft and preselecting a particular series of operations and means adapted to be connected thereto for rotating the striker plate so that the latter will be simultaneously rotated to engage the tripping pieces on the tripping piece shaft corresponding to the series of operations on the indicator drum uncovered by the mask.

5. Means for controlling the timing and sequence of operations in machines of the type referred to having the means claimed in claim 1 in combination with a vertical selector shaft by which any one of the plurality of series of operations can be selected, forks attached to said selector shaft and engaging the time obstruction drum, means for moving said shaft vertically into any one of the positions necessary for bringing the desired series of projecting members on the time obstruction drum into alignment with the pawl actuating the ratchet on the cam shaft, a formula drum on which the different series of operations are indicated one above the other, a mask covering said drum raised and lowered by the vertical selector shaft whereby the indications of all the series of operations except the series corresponding with the position of the selector shaft are marked, means for raising and lowering the vertical selector shaft and preselecting a particular series of operations means adapted to be connected thereto for rotating the striker plate so that the latter will be simultaneously rotated to engage the tripping pieces on the tripping piece shaft corresponding to the series of operations on the indicator drum uncovered by the mask, and means for preventing the operation of the vertical selector shaft unless the corresponding tripping piece shaft is in its correct angular position.

6. Means for controlling the timing and sequence of operations in machines of the type referred to having the means claimed in claim 1 in combination with a vertical selector shaft by which any one of the plurality of series of operations can be selected, forks attached to said selector shaft and engaging the time obstruction drum, means for moving said shaft vertically into any one of the positions necessary for bringing the desired series of projecting members on the time obstruction drum into alignment with the pawl actuating the ratchet on the cam shaft, a formula drum on which the different series of operations are indicated one above the other, a mask covering said drum raised and lowered by the vertical selector shaft whereby the indications of all the series of operations except the series corresponding with the position of the selector shaft are marked, means for raising and lowering the vertical selector shaft and preselecting a particular series of operations and means adapted to be connected thereto for rotating the striker plate so that the latter will be simultaneously rotated to engage the tripping pieces on the tripping piece shaft corresponding to the series of operations on the indicator drum uncovered by the mask, means for preventing the operation of the vertical selector shaft unless the corresponding tripping piece shaft is in its correct angular position, a sleeve operating a steam valve controlling cam having a plurality of series of projections thereon, one series for each series of operations, and means connected to the vertical selector shaft whereby the said sleeve is raised and lowered with the shaft, the time obstructor drum and the mask.

7. Means for controlling the timing and sequence of operations in machines of the type referred to having the means claimed in claim 1 in combination with a vertical selector shaft by which any one of the plurality of series of operations can be selected, forks attached to said selector shaft and engaging the time obstruction drum, means for moving said shaft vertically into any one of the positions necessary for bringing the desired series of projecting members on the time obstruction drum into alignment with the pawl actuating the ratchet on the cam shaft, a formula drum on which the different series of operations are indicated one above the other, a mask covering said drum raised and lowered by the vertical selector shaft whereby the indications of all the series of operations except the series corresponding with the position of the selector shaft are marked, means for raising and lowering the vertical selector shaft and preselecting a particular series of operations means adapted to be connected thereto for rotating the striker plate so that the latter will be simultaneously rotated to engage the tripping pieces on the tripping piece shaft corresponding to the series of operations on the indicator drum uncovered by the mask, means for preventing the operation of the vertical selector shaft unless the corresponding tripping piece shaft is in its correct angular position, a sleeve operating a steam valve controlling cam having a plurality of series of projections thereon, one series for each series of operations, means connected to the vertical selector shaft whereby the said sleeve is raised and lowered with the shaft, the time obstructor drum and the mask, and means for resetting the timing mechanism at any point in a series of operations to the commencement or any other point thereof.

TERENCE H. O'BRIEN.